(12) United States Patent
Schmidt et al.

(10) Patent No.: US 6,352,610 B1
(45) Date of Patent: Mar. 5, 2002

(54) COMPOSITE MATERIALS BASED ON VEGETABLE MATERIALS

(75) Inventors: Helmut Schmidt, Saarbruecken-Guedingen; Martin Mennig, Quierschied; Gerhard Jonschker, Spiesen-Elversberg, all of (DE)

(73) Assignee: Institut für Neue Materialien gemeinnützige GmbH (DE)

( * ) Notice: Subject to any disclaimer, the term of this patent is extended or adjusted under 35 U.S.C. 154(b) by 0 days.

(21) Appl. No.: 09/297,573

(22) PCT Filed: Nov. 14, 1997

(86) PCT No.: PCT/EP97/06372

§ 371 Date: May 3, 1999

§ 102(e) Date: May 3, 1999

(87) PCT Pub. No.: WO98/22536

PCT Pub. Date: May 28, 1998

(30) Foreign Application Priority Data

Nov. 15, 1996 (DE) .......................................... 196 47 368

(51) Int. Cl.⁷ .................................................. C09J 7/00
(52) U.S. Cl. ...................... 156/313; 156/283; 427/180; 516/9; 516/55
(58) Field of Search ................................ 156/313, 283; 427/180; 516/98, 55

(56) References Cited

U.S. PATENT DOCUMENTS 5,100,970 A * 3/1992 Roberts et al. ............. 525/342
5,719,206 A * 2/1998 Mihoya et al. ............. 564/558

OTHER PUBLICATIONS

*Dictionary of Engineering and Technology*, 5th ed., v. 1, p. 367, entry for "Foulard", Oscar Brandstetter Verlag, Wiesbaden, Germany.

* cited by examiner

Primary Examiner—John J. Gallagher
(74) *Attorney, Agent, or Firm*—Heller Ehrman White & McAuliffe LLP

(57) ABSTRACT

A composite material is described which is characterized by a substrate based on vegetable materials, in particular vegetable fibers, vegetable fiber raw materials or vegetable fiber semifinished products, and by a nanocomposite which is in functional contact with said substrate and is obtainable by surface modification of a) colloidal inorganic particles with
b) one or more silanes of the general formula (I)

$$R_x\text{—Si—}A_{4-x} \qquad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a below-stoichiometric amount of water, based on the hydrolysable groups which are present, with formation of a nanocomposite sol, and further hydrolysis and condensation of the nanocomposite sol, if desired, before it is brought into contact with the substrate, followed by curing.

20 Claims, No Drawings

COMPOSITE MATERIALS BASED ON VEGETABLE MATERIALS

The invention relates to composite materials characterized by a substrate based on vegetable materials, in particular vegetable fibres, vegetable fibre raw materials or vegetable fibre semifinished products, and by a nanocomposite which is in functional contact with said substrate and is obtainable by surface modification of a) colloidal inorganic particles with b) one or more silanes of the general formula (I)

$$R_x\text{—}Si\text{—}A_{4-x} \quad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where x≧1 in at least 50 mol % of the silanes;

under the conditions of the sol-gel process with a substoichiometric amount of water, based on the hydrolysable groups which are present, with formation of a nanocomposite sol, and further hydrolysis and condensation of the nanocomposite sol, if desired, before it is brought into contact with the substrate, followed by curing.

The substrate may be of very different physical forms, and be, for example, particulate, flocculent, fibrous, strip-shaped, plate-shaped, foil-shaped, sheet-shaped or block-shaped, or have a layered structure, or be a shaped article of any desired shape.

The nanocomposite, too, may be present in many different forms. It may, for example, cover the substrate entirely or partially, as a continuous coating or covering, or may be similar to a laminate between a number of substrates. Alternatively, the nanocomposite can form discontinuous or punctiform contacts between a plurality of substrates and, for example, act as a matrix in bonding a particulate, flocculent or fibrous substrate, as for example in insulating materials.

Suitable substrate materials for the novel composite materials are substrates based on vegetable materials, in particular vegetable fibres, vegetable fibre raw materials or vegetable fibre semifinished products, wood being excluded.

Examples of suitable substrate materials are natural fibres, e.g. seed fibres, such as cotton; fruit wall fibres, such as kapok; bast fibres, such as flax, hemp, jute or ramie; and hard fibres, such as sisal or coconut. Suitable vegetable fibre raw materials are, e.g., reed and rice or cereal and straw. Suitable vegetable fibre semifinished (processed) products are, e.g., fibre bundles, threads, cords, ropes, twines and yarns as well as semifinished products, such as wovens, fabrics, knits, braids, textiles, non-wovens, felts, webs and mats.

The nanocomposite employed according to the invention is prepared by surface modification of colloidal inorganic particles (a) with one or more silanes (b), if desired in the presence of other additives (c) under the conditions of the sol-gel process.

Details of the sol-gel process are described in C. J. Brinker, G. W. Scherer: "Sol-Gel Science—The Physics and Chemistry of Sol-Gel-Processing", Academic Press, Boston, San Diego, New York, Sydney (1990) and in DE 1941191, DE 3719339, DE 4020316 and DE 4217432.

Here, specific examples of the silanes (b) which can be employed according to the invention and of their radicals A which are hydrolytically removable and their radicals R which are not hydrolytically removable are given.

Preferred examples of groups A which are removable hydrolytically are hydrogen, halogen (F, Cl, Br and I, in particular Cl and Br), alkoxy (in particular $C_{2-4}$-alkoxy, alkoxy, such as ethoxy, n-propoxy, isopropoxy and butoxy), aryloxy (in particular $C_{6-10}$-aryloxy, such as phenoxy), alkaryloxy (e.g. benzyloxy), acyloxy (in particular $C_{1-4}$-acyloxy, such as acetoxy and propionyloxy) and alkylcarbonyl (e.g. acetyl). Radicals A which are likewise suitable are amino groups (e.g. mono- or dialkyl-, -aryl- and -aralkylamino groups having the abovementioned alkyl, aryl and aralkyl radicals), amide groups (e.g. benzamido) and aldoxime or ketoxime groups. Two or three radicals A may also together form a moiety which complexes the Si atom, as for example in Si-polyol complexes derived from glycol, glycerol or pyrocatechol. Particularly preferred radicals A are $C_{2-4}$-alkoxy groups, in particular ethoxy. Methoxy groups are less suitable for the purposes of the invention, since they have an excessively high reactivity (short processing time of the nanocomposite sol) and can give nanocomposites and/or composite materials with insufficient flexibility.

The abovementioned hydrolysable groups A may, if desired, carry one or more usual substituents, for example halogen or alkoxy.

The radicals R which are not hydrolytically removable are preferably selected from the group consisting of alkyl (in particular $C_{1-4}$-alkyl, such as methyl, ethyl, propyl and butyl), alkenyl (in particular $C_{2-4}$-alkenyl, such as vinyl, 1-propenyl, 2-propenyl and butenyl), alkynyl (in particular $C_{2-4}$-alkynyl, such as acetylenyl and propargyl), aryl (in particular $C_{6-10}$-aryl, such as phenyl and naphthyl) and the corresponding alkaryl and arylalkyl groups. These groups may also, if desired, have one or more usual substituents, for example halogen, alkoxy, hydroxy, amino or epoxide groups.

The abovementioned alkyl, alkenyl and alkynyl groups include the corresponding cyclic radicals, such as cyclopropyl, cyclopentyl and cyclohexyl.

Particularly preferred radicals R are substituted or unsubstituted $C_{1-4}$-alkyl groups, in particular methyl and ethyl, and substituted or unsubstituted $C_{6-10}$-alkyl groups, in particular phenyl.

It is also preferable that x in the above formula (I) is 0, 1 or 2, particularly preferably 0 or 1. It is also preferable if x=1 in at least 60 mol %, in particular at least 70 mol %, of the silanes of the formula (I). In particular cases, it may be even more favourable if x=1 in more than 80 mol %, or even more than 90 mol % (e.g. 100 mol %), of the silanes of the formula (I).

The novel composite materials may be prepared, for example, from pure methyltriethoxysilane (MTEOS) or from mixtures of MTEOS and tetraethoxysilane (TEOS), as component (b).

The use of silanes with one or more groups R which are substituted is advisable in particular where special properties are to be given to the composite material. For example, the introduction of fluorine atoms (e.g. in the form of substituted aliphatic (in particular alkyl) radicals) can give a composite material which has water-, dirt-, dust- and oil-repellent properties.

Concrete examples of silanes of the general formula (I) are compounds of the following formulae:

$Si(OC_2H_5)_4$, $Si(O\text{-}n\text{- or iso-}C_3H_7)_4$, $Si(OC_4H_9)_4$, $SiCl_4$, $Si(OOCCH_3)_4$, $CH_3\text{—}SiCl_3$, $CH_3\text{—}Si(OC_2H_5)_3$, $C_2H_5\text{—}SiCl_3$, $C_2H_5\text{—}Si(OC_2H_5)_3$, $C_3H_7\text{—}Si(OC_2H_5)_3$, $C_6H_5\text{—}Si\text{—}(OC_2H_5)_3$, $C_6H_5\text{—}Si(OC_2H_5)_3$, $(C_2H_5O)_3\text{—}Si\text{—}C_3H_6\text{—}Cl$, $(CH_3)_2SiCl_2$, $(CH_3)_2Si$ $(OC_2H_5)_2$, $(CH_3)_2Si(OH)_2$, $(C_6H_5)_2SiCl_2$, $(C_6H_5)_2Si(OC_2H_5)_2$, $(C_6H_5)_2Si(OC_2H_5)_2$, $(iso\text{-}C_3H_7)_3SiOH$, $CH_2\!=\!CH\!-\!Si(OOCCH_3)_3$, $CH_2\!=\!CH\!-\!SiCl_3$, $CH_2\!=\!CH\!-\!Si(OC_2H_5)_3$, $HSiCl_3$, $CH_2\!=\!CH\!-\!Si(OC_2H_4OCH_3)_3$, $CH_2\!=\!CH\!-\!CH_2\!-\!Si(OC_2H_5)_3$, $CH_2\!=\!CH\!-\!CH_2\!-\!Si(OOCCH_3)_3$, $CH_2\!=\!C(CH_3)COO\!-\!C_3H_7\!-\!Si\!-\!(OC_2H_5)_3$, $CH_2\!=\!C(CH_3)\!-\!COO\!-\!C_3H_7\!-\!Si(OC_2H_5)_3$, $n\text{-}C_6H_{13}\!-\!CH_2\!-\!CH_2\!-\!Si(OC_2H_5)_3$, $n\text{-}C_8H_{17}\!-\!CH_2\!-\!CH_2\!-\!Si(OC_2H_5)_3$,

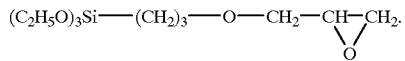

These silanes can be prepared by known methods; cf. W. Noll, "Chemie und Technologie der Silicone" [Chemistry and Technology of the Silicones], Verlag Chemie GmbH, Weinheim/Bergstraße, Germany (1968).

Based on the abovementioned components (a), (b) and (c), the proportion of component (b) is usually from 20 to 95% by weight, preferably from 40 to 90% by weight, and particularly preferably from 70 to 90% by weight, expressed as polysiloxane of the formula: $R_xSiO_{(2-0.5x)}$ which is formed in the condensation.

The silanes of the general formula (I) used according to the invention may be employed wholly or partially in the form of precondensates, i.e. compounds produced by partial hydrolysis of the silanes of the formula (I), either alone or in a mixture with other hydrolysable compounds. Such oligomers, preferably soluble in the reaction medium, may be straight-chain or cyclic low-molecular-weight partial condensates (polyorgano-siloxanes) having a degree of condensation of e.g. from about 2 to 100, in particular from about 2 to 6.

The amount of water employed for hydrolysis and condensation of the silanes of the formula (I) is preferably from 0.1 to 0.9 mol, and particularly preferably from 0.25 to 0.75 mol, of water per mole of the hydrolysable groups which are present. Particularly good results are often achieved with from 0.35 to 0.45 mol of water per mole of the hydrolysable groups which are present.

Specific examples of colloidal inorganic particles (a) are sols and powders dispersible at the nano level (particle size preferably up to 300 nm, in particular up to 100 nm and particularly preferably up to 50 nm) of $SiO_2$, $TiO_2$, $ZrO_2$, $Al_2O_3$, $Y_2O_3$, $CeO_2$, $SnO_2$, ZnO, iron oxides or carbon (carbon black and graphite), in particular of $SiO_2$.

The proportion of component (a), based on the components (a), (b) and (c), is usually from 5 to 60% by weight, preferably from 10 to 40% by weight, and particularly preferably from 10 to 20% by weight.

For preparing the nanocomposite, other additives in amounts of up to 20% by weight, preferably up to 10% by weight, and in particular up to 5% by weight, may be employed as optional components (c); examples are curing catalysts, such as metal salts and metal alkoxides (e.g. aluminium alkoxides, titanium alkoxides or zirconium alkoxides), organic binders, such as polyvinyl alcohol, polyvinyl acetate, starch, polyethylene glycol and gum arabic, pigments, dyes, flame retardants, compounds of glass-forming elements (e.g. boric acid, boric acid esters, sodium methoxide, potassium acetate, aluminium sec-butoxide, etc.), anti-corrosion agents and coating aids. According to the invention, the use of binders is less preferred.

The hydrolysis and condensation is carried out under sol-gel conditions in the presence of acid condensation catalysts (e.g. hydrochloric acid) at a pH of preferably from 1 to 2, until a viscous sol is produced.

It is preferable if no additional solvent is used besides the solvent produced in the hydrolysis of the alkoxy groups. If desired, however, alcoholic solvents, such as ethanol, or other polar, protic or aprotic solvents, such as tetrahydrofuran, dioxane, dimethylformamide or butyl glycol, for example, may be employed.

In order to achieve a favourable sol particle morphology and sol viscosity, the resultant nanocomposite sol is preferably subjected to a special post-reaction step in which the reaction mixture is heated to temperatures of from 40 to 120° C. over a period of from a number of hours to a number of days. Special preference is given to storage for one day at room temperature or heating for a number of hours at from 60 to 80° C. This gives a nanocomposite sol with a viscosity of preferably from 5 to 500 mPas, particularly preferably from 10 to 50 mPas. The viscosity of the sol can also, of course, be adjusted to suitable values for the specific application by adding solvents or removing side-products of the reaction (e.g. alcohols). The post-reaction step may preferably also be coupled with a reduction of the solvent content.

The proportion by weight of the nanocomposite in the composite material is preferably from 0.1 to 80% by weight, in particular from 1 to 40% by weight, and particularly preferably from 1 to 20% by weight.

The substrate and the nanocomposite or nanocomposite sol are combined after at least initial hydrolysis of component (b) and in any case before final curing. Before it is brought into contact with the substrate, the nanocomposite sol is preferably activated by feeding in a further amount of water.

The contact can be brought about by any means known to the person skilled in the art and deemed to be useful for the particular case, e.g. by simple mixing of substrate and nanocomposite sol, dipping, spraying or showering, knife- or spin-coating, pouring, spreading, brushing, etc., into the or with the nanocomposite sol. In order to improve the adhesion between substrate and nanocomposite, it may be advantageous in many cases to subject the substrate, before contact with the nanocomposite or its precursor, to a conventional surface pretreatment, e.g. corona discharge, degreasing, treatment with primers, such as aminosilanes, epoxy silanes, sizes made from starch or silicones, complexing agents, surfactants etc.

Before final curing, a drying step at room temperature or slightly elevated temperature (e.g. up to about 50° C.) may be undertaken.

The actual curing or a precuring can be carried out at room temperature, but preferably by heat treatment at temperatures above 50° C., preferably above 100° C. and particularly preferably at 150° C. or above. Curing times are generally in the range from minutes to hours, e.g. from 2 to 30 minutes.

Besides conventional curing by heat (e.g. in a circulating air oven) other curing methods may be used, for example photochemical curing (UV-VIS), electron-beam curing, rapid annealing and curing with IR beams or laser beams.

If desired, the composite prepared may also be subjected to a shaping process before curing.

The invention also relates to the use of the abovementioned nanocomposite for the coating and/or consolidation of the abovementioned substrates. The term "consolidation" is intended here to include any measure which is suitable for providing the substrate in consolidated and/or compacted form, and thus includes, for example, impregnation of the substrate with nanocomposite, embedding of the substrate into a matrix of nanocomposite or cementation or binding of substrates or pieces of substrate with nanocomposite. The term "coating" is taken to mean in particular a partial or complete encapsulation of a substrate with a nanocomposite in order to give this substrate, or pieces thereof, particular properties, for example oxidation resistance, flame retardancy, hydrophobic or oleophobic character, hardness, impermeability, or electrical or thermal insulation.

In particular, the present invention relates to heat insulating and soundproof light building elements formed of the composite, e.g. a slab or block of cut straw bonded by means of the nanocomposite. In this case, the composite may, optionally, be laminated with any other desired material such as, e.g., plywood slabs, wood fiber slabs, hard fibre boards or polystyrene plates. Likewise, the composite may be sandwiched between two or more of such laminate layers. These light building elements exhibit relatively high resistance to pressure and flame resistance (self-extinguishing properties).

The following examples further illustrate the present invention.

In the following examples, the silica sol employed is an aqueous silica sol from BAYER ("Levasil 300/30") with a solids content of 30% by weight and a particle size of from 7 to 10 nm. The following abbreviations are furthermore used in the examples:

MTEOS=Methyltriethoxysilane
TEOS=Tetraethoxysilane
PTEOS=Phenyltriethoxysilane
ETEOS=Ethyltriethoxysilane

EXAMPLE 1

1. Preparation of Standard Binder A

A flask is charged with 655 g of MTEOS and 191 g TEOS and then 142 g of aqueous silica sol and immediately thereafter 9 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or is refluxed for 1 hour to its further use.

2. Preparation of Standard Binder B

A flask is charged with 621 g of MTEOS and 181 g of TEOS and then 185 g of aqueous silica sol ("Levasil 50/50"; $SiO_2$ solids content 50% by weight, produced by BAYER) and immediately thereafter 10.3 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or refluxed for 1 hour prior to its further use.

3. Preparation of Standard Binder C

A flask is charged with 463 g of MTEOS, 180 g of TEOS and 128 g of dimethyldiethoxysilane, whereafter 267 g of aqueous silica sol and immediately thereafter 6.06 ml of HCl (37% by weight) are added to the resulting mixture with intensive stirring. After about 1 minute of intensive stirring an exothermic reaction sets in (temperature rise to about 60° C.). The dispersion can be used directly after cooling thereof to room temperature.

EXAMPLE 2

Production of Composites of Chinese (Ramie) Linen

To 100 g of Standard Binder A there are added 5.2 ml of water (activation) and thereafter neutralization to a pH value of about 3–4 is effected by means of 1.4 ml of sodium ethoxide solution (21% by weight) in ethanol. The Chinese linen (basis weight=228 g/m², 42 cm×42 cm) is impregnated with said binder dispersion and squeezed by means of a mangle. The individual Chinese linen layers are pre-dried for 3 hours in a compartment drier at 120° C. For the production of multi-layered composites the individual dried Chinese linen layers are again impregnated with the activated Standard Binder A and thereafter superimposed in wrinkleless condition between two Teflon spray-treated stainless steel plates and compressed in a heated press at 120° C. and at a compression pressure of 5 kPa for 30 minutes under reduced pressure (550 mbar). During the pressing operation the compression pressure is increased after 20 minutes from 5 kPa to 10 kPa for a further 15 minutes. By means of said process multi-layered Chinese linen composites can be produced.

EXAMPLE 3

Production of Composites of Jute Fabric

Standard Binder A (100 g) is neutralized and activated by aqueous sodium hydroxide (120 mg of NaOH in 5.2 ml of water). Jute fabrics (basis weight=300 g/m², 42 cm×42 cm) are impregnated with said binder dispersion and squeezed by means of a mangle. The individual jute fabric layers are pre-dried for 3 hours in a compartment drier at 120° C. For the production of multi-layered composites the individual dried jute fabric layers are again impregnated with the activated Standard Binder A and thereafter superimposed in wrinkleless condition between two Teflon spray-treated stainless steel plates and compressed in a heated press at 120° C. and at a compression pressure of 5 kPa for 30 minutes under reduced pressure (550 mbar). During the pressing operation the compression pressure is increased after 20 minutes from 5 kPa to 10 kPa for a further 15 minutes. By means of said process multi-layered jute fabric composites can be produced.

EXAMPLE 4

Production of Straw Composites

Under intensive stirring 520 ml of water are added dropwise to 10 kg of Standard Binder A and thereafter stirring is continued for about 10 minutes. Then blades of straw having a length of 30 cm are dipped into said binder dispersion and allowed to drain, care being taken that the binder dispersion inside the blades of straw drips off completely. Following the draining, the blades are stacked in parallel manner under a press to form a cuboid (about 30 cm×40 cm×50 cm) and compressed together. The assembly is dried at 140° C. in a vented compartment drier for 12 hours for bonding. The blades of straw bonded into a cuboid can be cut and may be sawn into plates of any desired thickness.

The straw plates obtained may be laminated with any desired materials. For example, a sawn plate having a thickness of 1 cm was laminated with 2 plywood panels having a thickness of 3 mm by brushing the Standard Binder B over the plywood panels and drying them for 5 hours at 140° C. in a heated press. The composite thus formed is self-extinguishing and has a compression strength of 4 t/cm².

EXAMPLE 5

A sol prepared from 47.9 ml of MTEOS, 17.9 ml of TEOS, 15.4 ml of ETEOS, 16.4 ml of silica sol and 0.48 ml of concentrated hydrochloric acid is diluted, 15 minutes after being prepared, with ethanol to a solids content of 3% by weight.

Cotton fabric with a weight per unit area of 50 g/m² is then saturated with this product and then pressed between two rubber rollers. Drying for 20 minutes at 100° C. gives an impregnated fabric with firm handle. Even after a number of washes, the impregnation is not removed.

EXAMPLE 6

The procedure of Example 5 is followed, with the exception that 1% of a fluorosilane (tridecafluoro-1,1,2,2-tetrahydrooctyl-1-triethoxysilane) is added 5 minutes before the dilution and that the dilution gives a solids content of 1.5% by weight. The cotton fabric is thereby tendered dirt- and water/oil-repellent and has a soft handle. Even after a number of washes of the fabric, the impregnation is not removed.

What is claimed is:

1. A method of manufacturing a composite material comprising a vegetable material substrate that is not wood and a nanocomposite in functional contact with the substrate, the method comprising:
   (1) surface modifying colloidal inorganic particles with one or more silanes of the general formula $R_x$—Si—$A_{4-x}$
   where each A is the same or different and is selected from hydroxyl and groups that are hydrolytically removable but are not methoxy, each R is the same or different and is selected from groups that are not hydrolytically removable, and x is 0, 1, 2, or 3, where $x \geq 1$ in at least 50 mol % of the silanes;
   under sol-gel process conditions with a quantity of water that is sub-stoichiometric based on the quantity of hydrolytically removable groups present on the silanes so that a polysiloxane is formed, thereby preparing a nanocomposite sol;
   (2) optionally further hydrolyzing and condensing the nanocomposite sol;
   (3) optionally activating the nanocomposite sol with a further quantity of water;
   (4) contacting the substrate with the nanocomposite sol to form an assembly; and
   (5) curing the assembly, thereby forming the composite material.

2. The method of claim 1 where the vegetable material substrate is selected from the group consisting of vegetable fibers, vegetable fiber raw materials, and vegetable fiber semifinished products.

3. The method of claim 1 where the step of preparing the nanocomposite sol is carried out in the presence of an acid condensation catalyst at a pH of from 1 to 2.

4. The method of claim 1 where the step of further hydrolyzing and condensing the nanocomposite sol takes place at a temperature between room temperature and 120° C.

5. The method of claim 1 where the colloidal inorganic particles are selected from the group consisting of sols and dispersible nanoscale powders of $TiO_2$, $ZrO_2$, $Al_2O_3$, $Y_2O_3$, $CeO_2$, $SnO_2$, ZnO, iron oxides, and carbon.

6. The method of claim 1 where the colloidal inorganic particles comprise from 5% to 60% by weight of the nanocomposite.

7. The method of claim 1 where the silanes, when expressed as polysiloxane of the formula $R_xSiO_{(2-0.5x)}$, comprise from 20% to 95% by weight of the composite.

8. The method of claim 1 where additives are added during preparation of the nanocomposite sol.

9. The method of claim 8 where the additives are selected from the group consisting of curing catalysts, organic binders, pigments, dyes, flame retardants, compounds of glass-forming elements, anti-corrosion agents, and coating aids.

10. The method of claim 8 where the additives comprise not more than 20% by weight of the nanocomposite.

11. The method of claim 1 where the quantity of water used in the step of preparing the nanocomposite sol is from 0.1 to 0.9 mol of water per mol of hydrolytically removable groups in the silanes.

12. The method of claim 1 where the nanocomposite comprises from 0.1 to 80% by weight of the composite material.

13. The method of claim 1 where the step of curing the contacted substrate comprises thermal curing.

14. The method of claim 12 where the thermal curing is carried out at a temperature between 50° C. and 300° C.

15. The method of claim 1 where the substrate is coated it with the nanocomposite.

16. The method of claim 1 where the substrate is consolidated with the nanocomposite.

17. The method of claim 1 where the substrate is a fabric and is impregnated with the nanocomposite.

18. The method of claim 1 where the colloidal inorganic particles have a particle size of up to 300 nm.

19. The method of claim 1 which further comprises forming a cemented laminate by contacting at least one of a surface of the composite and a surface of an additional selected material with additional nanocomposite sol, bringing the surfaces of the composite and the additional material into contact to form an assembly, and curing the assembly to form the laminate.

20. A laminate prepared by the method of claim 17.

* * * * *

UNITED STATES PATENT AND TRADEMARK OFFICE
CERTIFICATE OF CORRECTION

PATENT NO.   : 6,352,610 B1
DATED        : March 5, 2002
INVENTOR(S)  : Schmidt et al.

It is certified that error appears in the above-identified patent and that said Letters Patent is hereby corrected as shown below:

Column 8,
Line 49, "17" should read -- 19 --.
Add the following claim:
-- 21.   A composite material prepared by the method of claim 1. --

Signed and Sealed this

Eighth Day of October, 2002

Attest:

JAMES E. ROGAN
Attesting Officer        Director of the United States Patent and Trademark Office